US009197827B2

(12) United States Patent
Ono (10) Patent No.: US 9,197,827 B2
(45) Date of Patent: Nov. 24, 2015

(54) IMAGING DEVICE AND IMAGING METHOD

(71) Applicant: FUJIFILM CORPORATION, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/495,913

(22) Filed: Sep. 25, 2014

(65) Prior Publication Data

US 2015/0009369 A1 Jan. 8, 2015

Related U.S. Application Data

(63) Continuation of application No. PCT/JP2013/057989, filed on Mar. 21, 2013.

(30) Foreign Application Priority Data

Mar. 27, 2012 (JP) .................................. 2012-071123

(51) Int. Cl.
| | |
|---|---|
| *H04N 5/359* | (2011.01) |
| *G03B 15/00* | (2006.01) |
| *H04N 5/243* | (2006.01) |
| *H04N 5/217* | (2011.01) |
| *H04N 5/225* | (2006.01) |

(Continued)

(52) U.S. Cl.
CPC .............. *H04N 5/3595* (2013.01); *G03B 15/00* (2013.01); *H04N 5/217* (2013.01); *H04N 5/23229* (2013.01); *H04N 5/243* (2013.01); *H04N 5/2254* (2013.01); *H04N 5/2356* (2013.01); *H04N 5/23212* (2013.01); *H04N 5/3696* (2013.01)

(58) Field of Classification Search
CPC . H04N 5/3595; H04N 5/243; H04N 5/23229; H04N 5/2254; H04N 5/23212; H04N 5/2356; H04N 5/3639; H04N 5/217; G03B 15/00
See application file for complete search history.

(56) References Cited

U.S. PATENT DOCUMENTS 7,474,352 B2 * 1/2009 Oikawa .......................... 348/349
2005/0168620 A1 * 8/2005 Shiraishi ....................... 348/345

(Continued)

FOREIGN PATENT DOCUMENTS

| JP | 2003-270526 | 9/2003 |
|---|---|---|
| JP | 2007-122055 | 5/2007 |

(Continued)

OTHER PUBLICATIONS

International Search Report—PCT/JP2013/057989—May 7, 2013.

*Primary Examiner* — Luong T Nguyen
(74) *Attorney, Agent, or Firm* — Young & Thompson (57) ABSTRACT

An imaging method uses an imaging device including a taking lens having a plurality of regions each with an independent characteristic and an image pickup element having a plurality of light-receiving sensors provided so as to correspond to the plurality of regions, the plurality of light-receiving sensors performing pupil division of a light beam passing through any of the plurality of regions for selective light-receiving, from an imaging signal from a light-receiving sensor corresponding to one region of the plurality of regions, an image corresponding to the one region is generated. When the generated image is corrected, an influence of a light beam passing through a region other than the one region is removed from the image generated so as to correspond to the one region.

8 Claims, 9 Drawing Sheets

(51) Int. Cl.
  *H04N 5/232*  (2006.01)
  *H04N 5/235*  (2006.01)
  *H04N 5/369*  (2011.01)

(56) References Cited

U.S. PATENT DOCUMENTS

2007/0097253 A1   5/2007   Woo et al.
2009/0179143 A1   7/2009   Murook et al.
2012/0147212 A1*  6/2012   Hara et al. .................. 348/223.1
2013/0021519 A1*  1/2013   Hamada ........................ 348/349

FOREIGN PATENT DOCUMENTS

JP   2007-306406   * 11/2007
JP   2009-122524     6/2009
JP   2009-157043     7/2009
JP   2009-169096     7/2009
JP   2010-154115     7/2010

* cited by examiner

IMAGING DEVICE AND IMAGING METHOD

CROSS-REFERENCE TO RELATED APPLICATIONS

This application is a Continuation of PCT International Application No. PCT/JP2013/057989 filed on Mar. 21, 2013, which claims priority under 35 U.S.C. §119(a) to Japanese Patent Application No. 2012-71123 filed on Mar. 27, 2012. Each of the above application(s) is hereby expressly incorporated by reference, in its entirety, into the present application.

BACKGROUND OF THE INVENTION

1. Field of the Invention

The present invention relates to an imaging device and imaging method capable of obtaining a plurality of images with different characteristics.

2. Description of the Related Art

In the field of imaging devices, a technique has been known in which a plurality of images with different characteristics are obtained by imaging a plurality of times with varied imaging conditions or using lens systems having a plurality of characteristics and the obtained images are processed according to the purpose (for example, refer to PTL 1: Japanese Patent Application Laid-Open No. 2007-122055 and PTL 2: Japanese Patent Application Laid-Open No. 2003-270526). The optical system described in PTL 1 describes that two or more curved surfaces with different radiuses of curvature are concentrically arranged in a taking lens to obtain a plurality of focal length regions with a single lens and, by performing restoring processing on an image obtained by using this taking lens, an image corresponding to each focal length is obtained. Similarly, also in the imaging optical system described in PTL 2, with varied curvature between an inner region and an outer region of an image forming lens, each region has a different focal length, and images corresponding to a plurality of focal lengths can be obtained.

SUMMARY OF THE INVENTION

However, in these conventional techniques, image quality of the images corresponding to the respective focal lengths is not favorable, and the features of the lens with many characteristics (such as the focal length and the focal distance) are not fully utilized. For example, the technique described in the above-described PTL 1 has a problem in which, since signals corresponding to a plurality of focal lengths are superposed on an output from an image sensor, the influence of signals corresponding to different focal lengths is not fully separated, thereby degrading image quality of the images corresponding to the respective focal lengths. Also in the technique described in the above-described PTL 2, as with PTL 1, signals corresponding to a plurality of focal lengths are superposed on an output from an image sensor. In the technique described in PTL 2, in a mode of obtaining and using an image with this superposition left as it is, the image quality of the images corresponding to the respective focal lengths is degraded. Also, in a mode in which a shape-variable iris letting subject light passing through only any of focal regions is arranged near the lens and only an image corresponding to any relevant focal length is obtained, there is a problem, for example, in which a plurality of images corresponding to a plurality of focal length cannot be simultaneously obtained.

Moreover, to avoid degradation in image quality as described above, if imaging is performed a plurality of times by changing the focal length of the taking lens, imaging takes time. Furthermore, problems may occur such that the subject moves or the brightness of the subject changes during imaging to vary imaging conditions among images.

The present invention was made in view of these circumstances, and has an object of providing an imaging device capable of simultaneously obtaining a plurality of images while ensuring favorable image quality.

To achieve the object described above, an imaging device according to a first mode of the present invention includes a taking lens having a plurality of regions, the plurality of regions each with an independent characteristic, an image pickup element having a plurality of light-receiving sensors provided so as to correspond to the plurality of regions, the plurality of light-receiving sensors performing pupil division of a light beam passing through any of the plurality of regions for selective light-receiving, an image generating unit which generates, from an imaging signal from a light-receiving sensor corresponding to one region of the plurality of regions, an image corresponding to the one region, and an image correcting unit which corrects the generated image, wherein the independent characteristic is at least either one of a focal length and a focal distance, and the image correcting unit removes an influence of a light beam passing through a region other than the one region from the image generated so as to correspond to the one region.

In the first mode, the "focal distance" is a distance FD represented in the following equation, that is, a distance from the light-receiving plane of the light-receiving sensor to a subject with an in-focus relation with the light-receiving sensor.

$$FD = a + b$$

FD: focal distance
a: distance between the lens and the light-receiving plane of the light-receiving sensor
b: distance between the lens and focal position Note that when f is taken as the focal length, $1/f = (1/a) + (1/b)$, and the focal distance FD is varied depending on the combination of the distances a and b even with the same focal length f. Conversely, the focal distance FD can be made the same depending on the combination of the distances a and b even with the focal length f is varied.

In the first mode, a plurality of images can be simultaneously obtained, and it is not required to spend time in imaging repeatedly many times to obtain a plurality of images, and the subject position is not shifted between images. Note in the first mode that the characteristic (at least either one of the focal length and the focal distance) of each region is "independent", which refers to that the characteristic of one region does not depend on the characteristic of another region. Specific focal length and focal distance may be equal or varied.

When a taking lens having a plurality of regions each with an independent characteristic is used as in the first mode, when the subject image formed on the light-receiving sensor in each region of the taking lens is varied, a shift in characteristic among subject images occurring due to superposition of different subject images is felt as degradation in image quality. Main factors for different subject images are (1) a difference in size between subject images, (2) a difference in blurring amount between subject images, and (3) a parallax shift between subject images. Relations with the characteristic (focal length, focal distance) of each region are as follows.

(i) When both of the focal length and the focal distance are varied between regions, a difference in size, a difference in blurring amount, and a parallax shift occur between images corresponding to these regions.

(ii) When the focal length is the same but the focal distance is varied between regions, a difference in blurring amount and a parallax shift occur between images corresponding to these regions.

(iii) When the focal length is varied but the focal distance is the same between regions, a difference in size and a difference in blurring amount of the subject images occur between images corresponding to these regions.

(iv) When both of the focal length and the focal distance are the same, a parallax shift occurs between images corresponding to these regions.

And, when a taking lens having a plurality of regions each with an independent characteristic is used, in the conventional techniques, as in (i) to (iv) described above, image quality is degraded due to a difference in subject image occurring correspondingly to the characteristic of each region, that is, an influence of a light beam passing through another region in the image corresponding to one region (crosstalk between regions).

Thus, in the imaging device according to the first mode, by an unprecedented scheme of using an image pickup element having light-receiving sensors (pupil-oriented sensors) performing pupil division of the light beam passing through one region of the above-described taking lens, the influence of crosstalk between regions is removed, and a plurality of images with independent characteristics with favorable image quality can be obtained. Note that pupil division of the light beam and selective light receiving by the light-receiving sensors can be achieved by optical elements, such as a light-shielding member, a liquid-crystal shutter, and a liquid-crystal prism provided on a light-receiving plane or at the front thereof.

Furthermore, in the imaging device according to the first mode, crosstalk components are removed by the image correcting unit in addition to the pupil-oriented sensors. Therefore, images with more favorable image quality can be obtained.

As such, in the imaging device according to the first mode, a plurality of images with independent characteristics can be simultaneously obtained, while favorable image quality is ensured. Note in the first mode that the number of taking lenses may be one, or a plurality of lenses may be combined to configure a taking lens so that the taking lens has a plurality of regions as a whole. Also in the first mode, the characteristic (focal length, focal distance) may be fixed or changeable.

In an imaging device according to a second mode of the present invention, in the first mode, the image correcting unit performs the removal in consideration of position dependency of a degree of the influence of the light beam passing through the region other than the one region in the generated image. This refers to that dependency of the degree of mixture of the above-described crosstalk components also on the location in the image is taken into consideration. With this, in the imaging device according to the second mode, the crosstalk components can be accurately removed, and images with more favorable image quality can be obtained.

In an imaging device according to a third mode of the present invention, in the second mode, the image correcting unit removes an influence of shading on the light beam passing through the one region from the image generated so as to correspond to the one region. In the imaging device according to the third mode, the influence of not only crosstalk in the target region from another region but also shading (shading with respect to main gain) of the light beam itself passing through the one region is removed. With this, images with more favorable image quality can be obtained.

In an imaging device according to a fourth mode of the present invention, in any of the first to third modes, the image correcting unit performs the removal in consideration of position dependency of the degree of the influence of shading in the generated image. In the fourth mode, as with the case of crosstalk, this refers to that the influence of shading depends also on the location in the image is taken into consideration. With this, the influence of shading can be accurately removed, and images with more favorable image quality can be obtained.

In an imaging device according to a fifth mode of the present invention, in any of the first to fourth modes, the image generating unit performs the removal based on the following Equation (1).

$$(A_1, A_2, \ldots, A_N)^T = X^{-1} \cdot (A_1', A_2', \ldots, A_N')^T \quad \text{(Equation 1)}$$

where

N: the number of region of the taking lens (an integer equal to two or more)

$A_i(x, y)$: an imaging signal after correction of the influence of the light beam passing through another region corresponding to the region i (i=1 to N)

$A_i'(x, y)$: an imaging signal before correction of the influence of the light beam passing through another region corresponding to the region i (i=1 to N)

$X^{-1}$: an inverse matrix of a matrix X formed of main gain and crosstalk components $X_{ii} = S_i(x, y)$ (main gain of the region i; i=1 to N)

$X_{ji} = C_{ji}(x, y)$ (crosstalk component from the region j to the region i; j=1 to N, j≠i)

(x, y): picture element position of an image corresponding to a region i

The fifth mode describes a specific mode of removal described above. If main gain shading is not present at all, $X_{ii}$ ($=S_i$) described above is 1, irrespective of the picture element position. Also, if crosstalk components are not present at all, $X_{ji}$ ($=C_{ji}$) described above is 0, irrespective of the picture element position. If neither shading nor crosstalk is present at all, the matrix X is a unit matrix. In this case, $(A_1, A_2, \ldots, A_N)^T = (A_1', A_2', \ldots, A_N')^T$....

In an imaging device according to a sixth mode of the present invention, in any of the first to fifth modes, the image generating unit generates an image by combining the plurality of images obtained by the removal. As described above, in the imaging device of the present invention, a plurality of images corresponding to the respective regions of the taking lens can be obtained with favorable image quality. Therefore, in the imaging device according to the sixth mode, these images can be combined according to the purpose to obtain a desired image. For example, a specific region can be extracted from the plurality of images for combining, and each of the plurality of images can be weighted for combining. With this, in the imaging device according to the sixth mode, it is possible to generate an image in which a specific subject is accurately in focus and other subjects are blurred at a desired degree, an image in which all subjects are accurately in focus, and so on.

In an imaging device according to a seventh mode of the present invention, in any of the first to sixth modes, the taking lens is a taking lens formed of two or more physically separated lenses, and the plurality of regions of the taking lens each have an independent characteristic so as to correspond to a combination of the two or more lenses. As described above, in the imaging device according to the present invention, the taking lens may be configured of a plurality of lenses. The seventh mode represents one mode of this taking lens formed of a plurality of lenses. In an example of the taking lens in the seventh mode, a plurality of lenses corresponding to a plurality of regions are arranged so that the positions in an optical axis direction are spaced apart from each other, and the plurality of lenses each have an independent focal length.

In an imaging device according to an eighth mode of the present invention, in any of the first to seventh modes, a characteristic changing unit which changes the characteristic of the taking lens is provided. This is to obtain a desired image by changing the characteristic (at least one of the focal distance and the focal length) according to the imaging purpose and so on.

To achieve the object described above, an imaging method according to a ninth mode is an imaging method in an imaging device including a taking lens having a plurality of regions, the plurality of regions each with an independent characteristic and an image pickup element having a plurality of light-receiving sensors provided so as to correspond to the plurality of regions, the plurality of light-receiving sensors performing pupil division of a light beam passing through any of the plurality of regions for selective light-receiving, the independent characteristic being at least either one of a focal length and a focal distance, the method including an image generating step of generating, from an imaging signal from a light-receiving sensor corresponding to one region of the plurality of regions, an image corresponding to the one region, and an image correcting step of correcting the generated image, wherein an influence of a light beam passing through a region other than the one region is removed from the image generated so as to correspond to the one region. In the ninth mode, as with the first mode, a plurality of images can be simultaneously obtained while favorable image quality is ensured.

As has been described above, according to the present invention, a plurality of images can be simultaneously obtained while favorable image quality is ensured.

DETAILED DESCRIPTION OF THE PREFERRED EMBODIMENTS

Modes for carrying out the imaging device and imaging method according to the present invention are described in detail below by following the attached drawings.

<Structure of Imaging Device>

Figure 1:
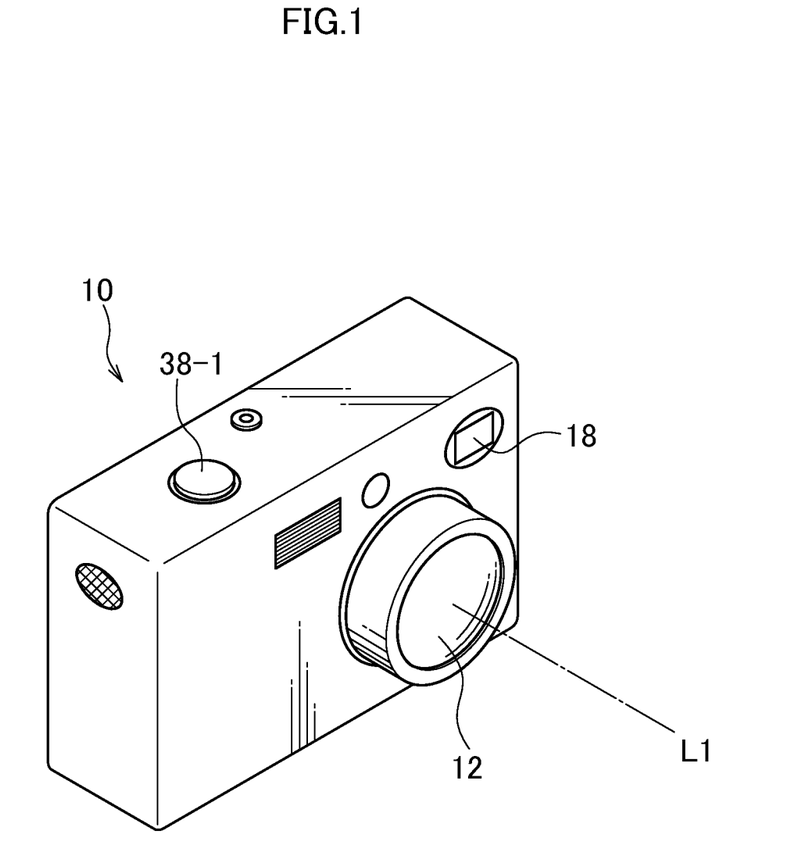
FIG. 1 is an external perspective view of an imaging device 10 according to the present invention.
Figure 2:
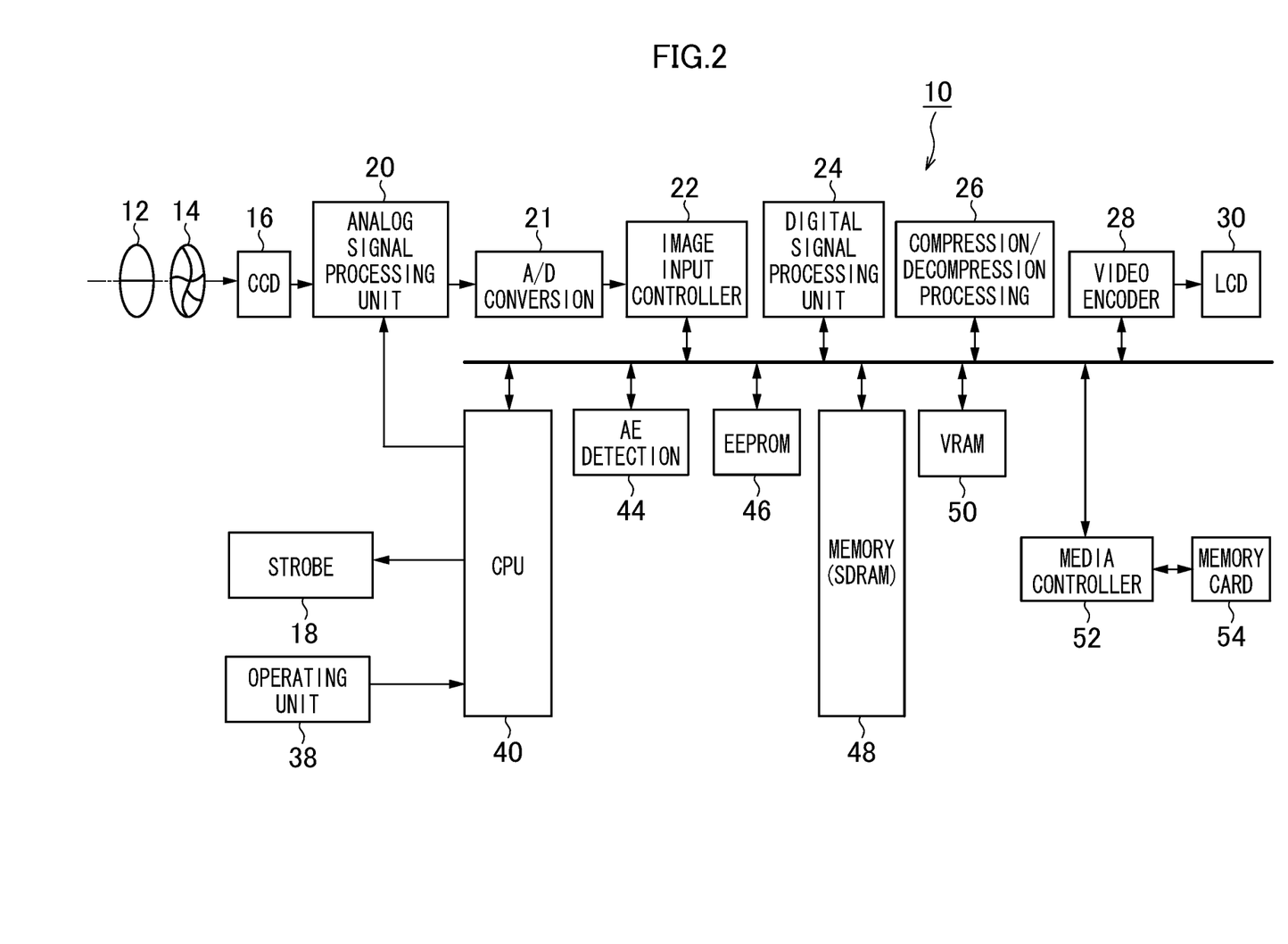
FIG. 2 is a block diagram depicting the structure of main parts of the imaging device 10.

FIG. 1 is an external perspective view of an imaging device 10 (imaging device) according to a first embodiment. FIG. 2 is a block diagram depicting the structure of main parts of the imaging device 10. As depicted in FIG. 1, a taking lens 12 (taking lens), a strobe 18, and so on are arranged on the front surface of the imaging device 10, and a release button 38-1 is provided on the upper surface. L1 represents an optical axis of the taking lens 12.

FIG. 2 is a block diagram depicting the structure of main parts of the imaging device 10. The operation of the imaging device 10 as a while is controlled by a central processing device (CPU) 40 in a centralized manner, and programs required for the operation of the CPU 40 (including programs for use in imaging processing, image generation/combining processing, and so on, which will be described further below) and parameters are stored in an EEPROM (Electronically Erasable and Programmable Read Only Memory) 46.

The imaging device 10 is provided with, in addition to a release button 38-1, an operating unit including a mode dial, a replay button, a MENU/OK key, a cross key, a BACK key, and so on. A signal from this operating unit 38 is inputted to the CPU 40. Based on the input signal, the CPU 40 controls each circuit of the imaging device 10, which will be described further below.

The release button 38-1 is an operation button for inputting an instruction for starting imaging, and is configured of a two-step-stroke type switch formed of an S1 switch which is turned ON at the time of a half press and an S2 switch which is turned ON at the time of a full press. The mode dial is means which selects a still-picture/moving-picture taking mode, a manual/auto imaging mode, an imaging scene, and so on.

The replay button is a button for switching to a replay mode in which a still picture or a moving picture of images taken and recorded is displayed on a liquid-crystal monitor 30 (LCD: Liquid Crystal Display). The MENU/OK key is an operation key including both of a function for making an instruction for causing a menu to be displayed on a screen of the liquid-crystal monitor 30 and a function for making an instruction for entering and performing a selected content. The cross key is an operating unit for inputting instructions in four directions, that is, upward, downward, leftward, and rightward, and functions as cursor moving operation means, a zoom switch, a frame-advance button at the time of a replay mode, and so on. The BACK key is used to delete a desired target such as a selected item, cancel an instructed content, return to an immediately previous operation state, or the like. These buttons and keys can be used also for an operation necessary in image e combining.

In an imaging mode, an image of image light representing a subject is formed on a light-receiving plane of a solid image pickup element (image pickup element: hereinafter referred to as a "CCD (Charge Coupled Device)") 16 via a taking lens 12 (taking lens) and an iris 14.

Figure 3:
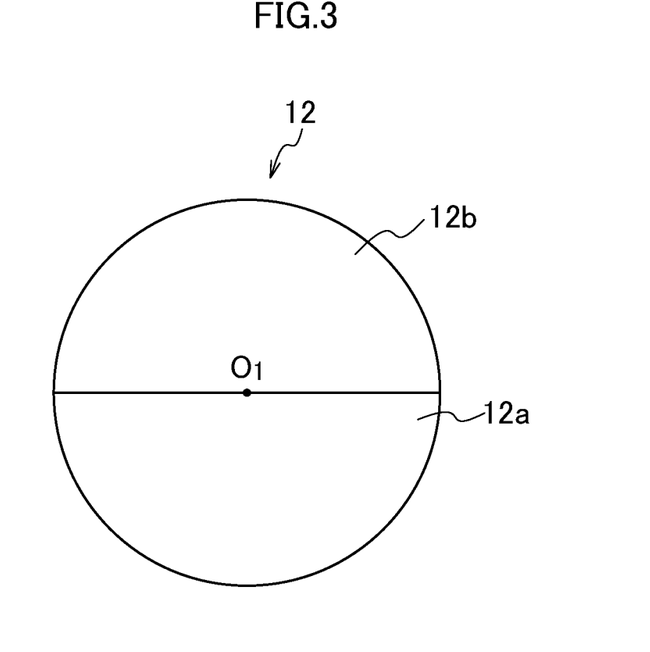
FIG. 3 is a front view of a taking lens 12.

FIG. 3 is an external view of the taking lens 12. The taking lens 12 has a region 12a with a long focal distance (hereinafter referred to as a far focal region) and a region 12b with a focal distance shorter than that of the far focal region 12a (hereinafter referred to as a near focal region). As depicted in FIG. 3, regions each in a half-moon shape when viewed from the front are provided above and below a lens center O1, and are the far focal region 12a and the near focal region 12b in the order from the lower portion. Note that while focal lengths in respective regions are equal to each other in the taking lens 12, the characteristic of each region of the takin glens is not restricted by this condition in the imaging device of the present invention. Specific values may be identical or varied as long as at least one of the focal distance and the focal length is independent in each region. Also in these regions, specific values of the focal distance and the focal length may be set according to the imaging purpose or the like.

Note that while each region is formed in a half-moon shape in the example of FIG. 3, a circular region arranged at the lens center and its surrounding annular region (either one of these regions is a far focal region and the other is a near focal region) may be formed. Also, while the area of the far focal region 12a is equal to the area of the near focal region 12b in the example of FIG. 3, the area ratio between these regions may be set at a ratio different from the above according to the characteristic of an optical system, the imaging purpose, the imaging condition, and so on. Also, the number of regions is not restricted to two, but may be three or more.

With this structure, the imaging device 10 according to the present embodiment, two images with different focal distances can be simultaneously obtained. It is not required to spend time in imaging repeatedly many times, and the subject position is not shifted between images.

Figure 4:
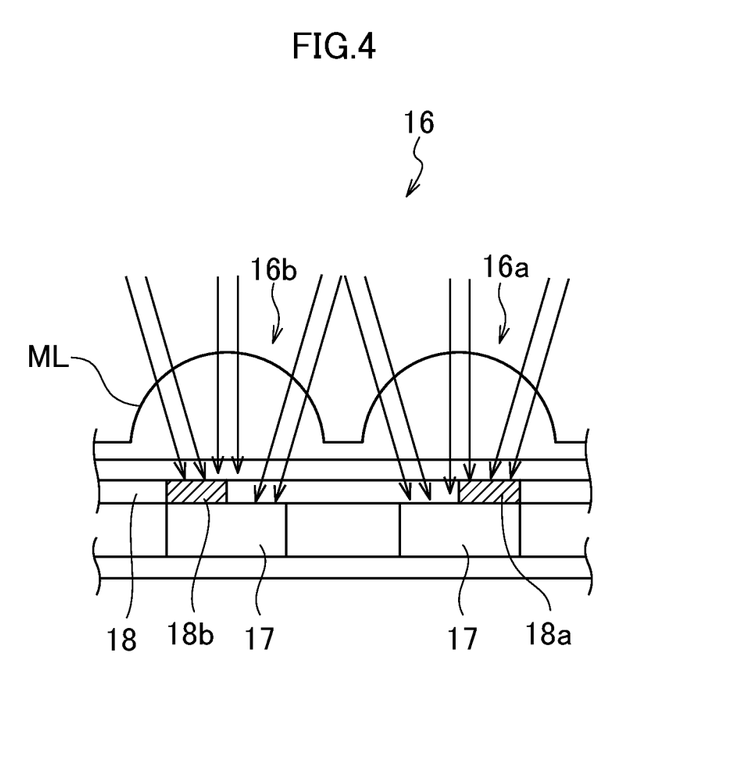
FIG. 4 is a diagram depicting the state of selective light-beam receiving at an image pickup element 16.

A light beam passing through the far focal region 12a and the near focal region 12b of the taking lens 12 enters each photo sensor (light-receiving sensor) of the CCD 16 (image pickup element). As depicted in FIG. 4, the CCD 16 has a far-image light-receiving cell 16a which receives a light beam passing through the far focal region 12a of the taking lens 12 and a near-image light-receiving cell 16b which receives a light beam passing through the near focal region 12b. The light-receiving cells 16a and 16b selectively receive a light beam passing through the far focal region 12a and the near focal region 12b with pupil division by micro lenses ML and light-shielding films 18a and 18b, respectively, provided on the front surface of a light-receiving unit 17. Therefore, the light-shielding films 18a and 18b have different shapes. Note that in place of providing light-shielding films on the front surface of the light-receiving unit 17, a light-shielding member or a liquid-crystal shutter may be provided on the front surface of each micro lens ML.

In the imaging device 10, by the CCD 16 capable of selective light receiving as described above, the influence of crosstalk from one to the other of the far focal region 12a and the near focal region 12b is removed, and an image with favorable image quality can be obtained.

Figure 5:
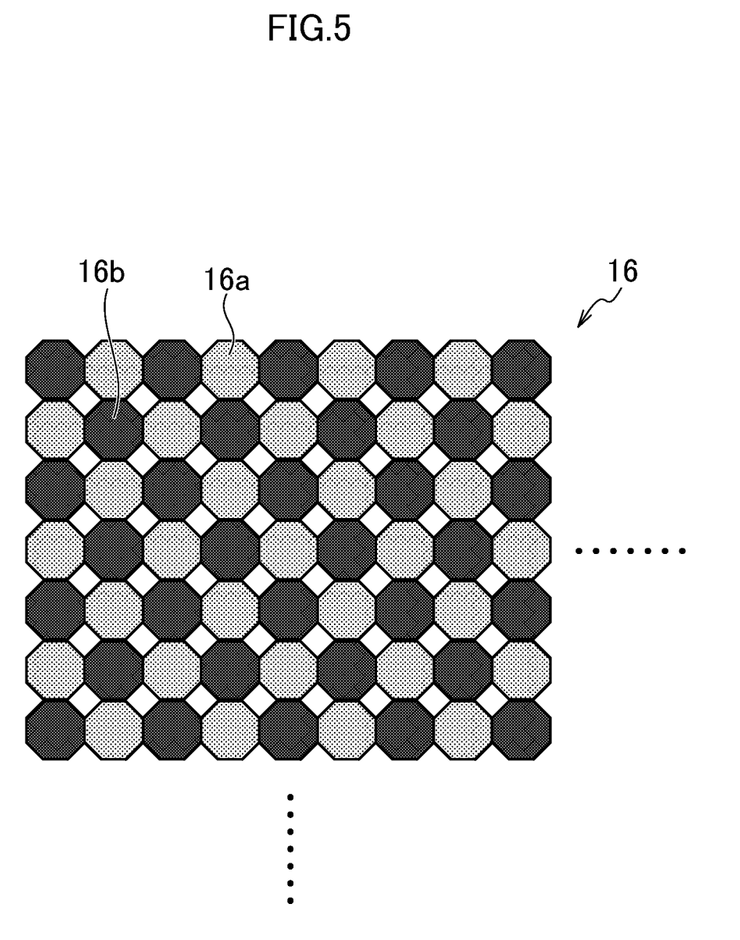
FIG. 5 is a diagram depicting an example of arrangement of light-receiving cells in the image pickup element 16.

A number ratio between the light-receiving cells 16a and 16b is preferably substantially equal to the area ratio between the far focal region 12a and the near focal region 12b corresponding to the light-receiving cells 16a and 16b. FIG. 5 depicts an example of arrangement of light-receiving cells in the image pickup element 16. In the present embodiment, since the area of the far focal region 12a and the area of the near focal region 12b are equal to each other, the number of light-receiving cells 16a and the number of light-receiving cells 16b are also equal to each other. The light-receiving cells 16a and 16b are preferably arranged so as to prevent degradation of image quality in a specific region or direction in a generated image, and a loss of picture element data due to mixture of cells corresponding to the plurality of focal regions is preferably compensated for by interpolation or the like as appropriate.

The CPU 40 controls the iris 14 via an iris driving unit (not depicted in the drawing), and also controls a charge accumulation time (shutter speed) at the CCD 16 via a CCD control unit (not depicted in the drawing), reading of an image signal from the CCD 16, and so on. Signal charges accumulated in the CCD 16 are read as a voltage signal according to a signal charge based on a read signal provided from the CCD control unit, and is provided to an analog signal processing unit 20.

The analog signal processing unit 20 samples and holds image signals for each picture element by correlated double sampling processing on a voltage signal outputted from the CCD 16, amplifies the signals, and then applies the signals to an A/D converter 21. The A/D converter 21 converts sequentially inputted analog R, G, and B signals to digital R, G, and B signals for output to an image input controller 22. Note that a MOS (metal-oxide semiconductor)-type image pickup element can be used in place of the CCD 16. In this case, the A/D converter 21 is often incorporated in the image pickup element, and the above-described correlated double sampling is not required.

A digital signal processing unit 24 performs predetermined signal processing such as offset processing, gain control processing including white balance correction and sensitivity correction, gamma correction processing, YC processing, and so on, on the digital image signal inputted via the image input controller 22.

The image data processed at the digital signal processing unit 24 is inputted to a VRAM (Video Random Access Memory) 50. The VRAM 50 includes an A region and a B region each for storing image data representing an image for one frame. The image data representing an image for one frame is alternately rewritten in the A region and the B region, and the written image data is read from a region other than the region where the image data is rewritten. The image data read from the VRAM 50 is encoded at a video encoder 28, and is outputted to the liquid-crystal monitor 30. With this, a subject image is displayed on the liquid-crystal monitor 30. For the liquid-crystal monitor 30, a touch panel is adopted, and is displaying the obtained image and allowing a user operation via a screen.

When the release button 38-1 is pressed in the first stage (half press), the CPU 40 starts an AE (Automatic Exposure) operation. Also, the image data outputted from the A/D converter 21 when the release button 38-1 is pressed halfway is captured into an AE detecting unit 44.

The CPU 40 calculates brightness (imaging Ev value) of the subject from an integrated value of G signals inputted from the AE detecting unit 44, determines an iris value of the iris 14 and an electrical shutter (shutter speed) of the CCD 16 based on this imaging Ev value, and controls a charge accumulation time at the iris 14 and the CCD 16 based on the determination result.

When the AE operation ends and the release button 38-1 is pressed in the second stage (full press), in response to this press, image data corresponding to the far focal region 12a and the near focal region 12b is outputted from the A/D converter 21 and inputted from the image input controller 22 to a memory (SDRAM: Synchronous Dynamic Random Access Memory) 48 for temporary storage.

After temporary storage in the memory 48, through signal processing such as YC processing at the digital signal processing unit 24 and compression processing to a JPEG (joint photographic experts group) format at a compression/decompression processing unit 26, and so on, image files are generated. These image files are read by a media controller 52 and recorded in a removable recording medium (for example, a memory card 54). Images recorded in the memory card 54 can be replayed and displayed on the liquid-crystal monitor 30 by operating the replay button of the operating unit 38.

<Image Obtainment>

Figure 6:
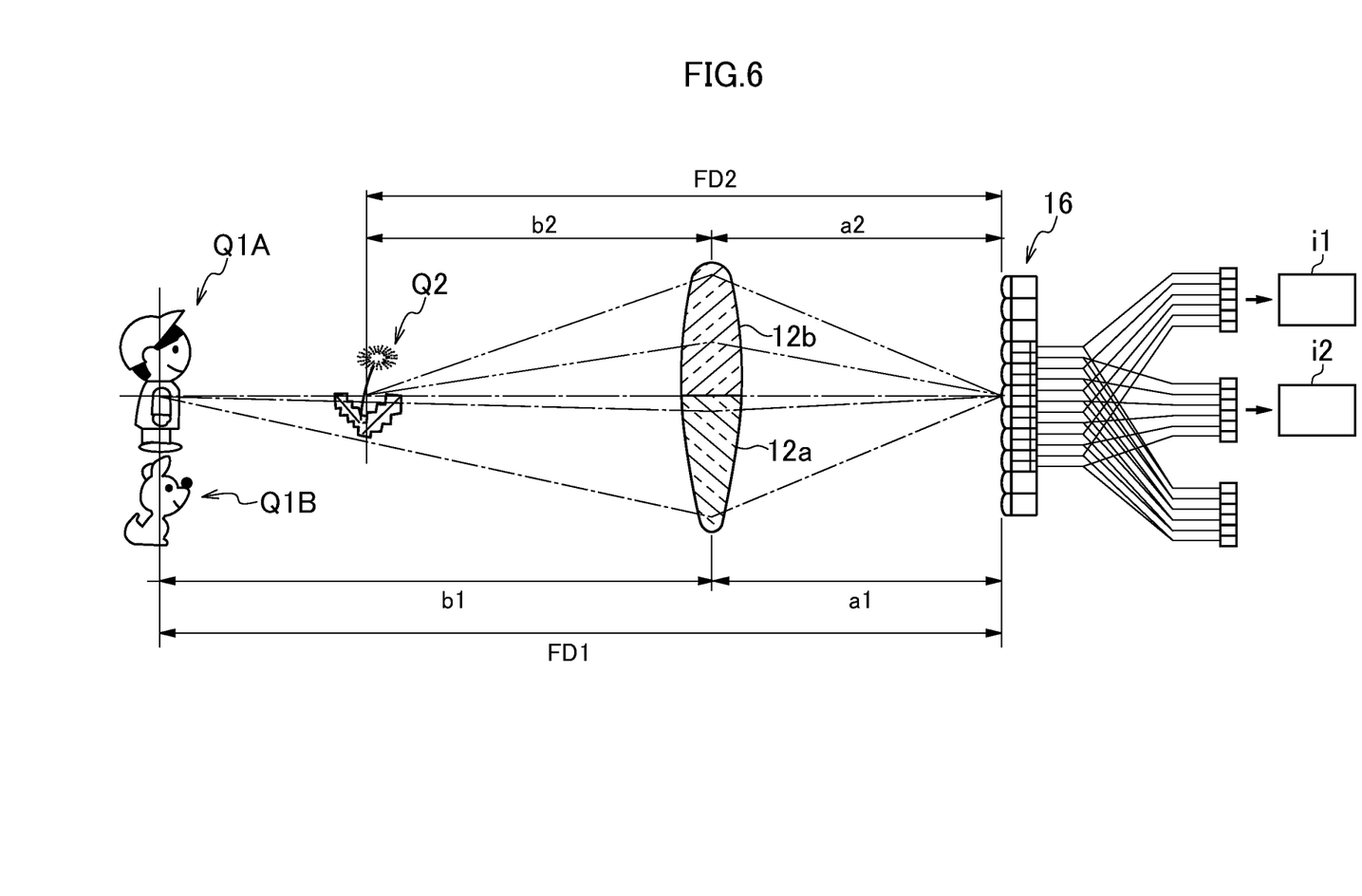
FIG. 6 is a diagram depicting the state of imaging by the imaging device 10.

Next, image obtainment at the imaging device 10 is described. FIG. 6 is a diagram depicting the state of obtainment of focal images i1 and i2 (a far focal image and a near focal image) in the far focal region 12a and the near focal region 12b of the taking lens 12, and reference characters denote as follows.

Reference characters in FIG. 6 denote as follows.

a1, a2: lens-light-receiving plane distances of the far focal region 12a and the near focal region 12b, respectively b1, b2: lens-subject distances of the far focal region 12a and the near focal region 12b, respectively FD1, FD2: focal distances of the far focal region 12a and the near focal region 12b, respectively Q1A, Q1B, Q2: subject Note in the present embodiment that the "focal distance" refers to a distance from the light-receiving plane of the light-receiving sensor to a subject in a focal relation with the light-receiving sensor, and the focal distances are FD1=a1+b1 and FD2=a2+b2. Also, when the focal length of the far focal region 12a and the focal length of the near focal region 12b are assumed to be f1 and f2, respectively, 1/f1=(1/a1)+(1/b1), and 1/f2=(1/a2)+(1/b2).

Figure 7A:
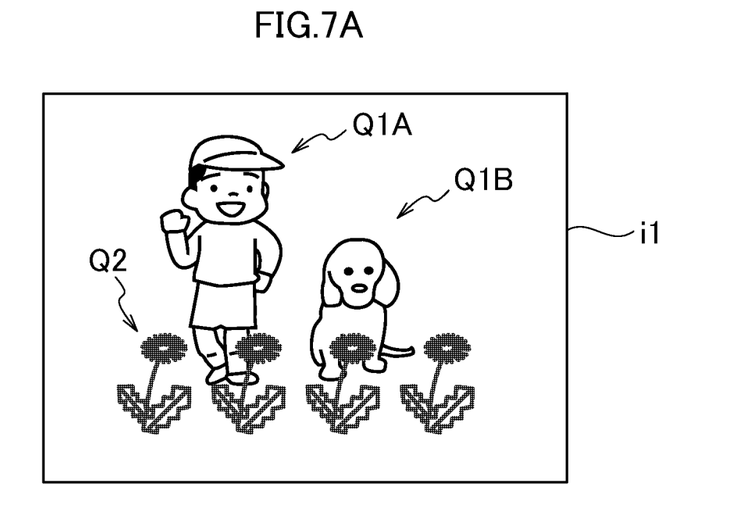
FIG. 7A is a diagram depicting an example of an image (an image corresponding to a far focal region) when imaging signals corresponding to the respective focal regions are completely separated.
Figure 7B:
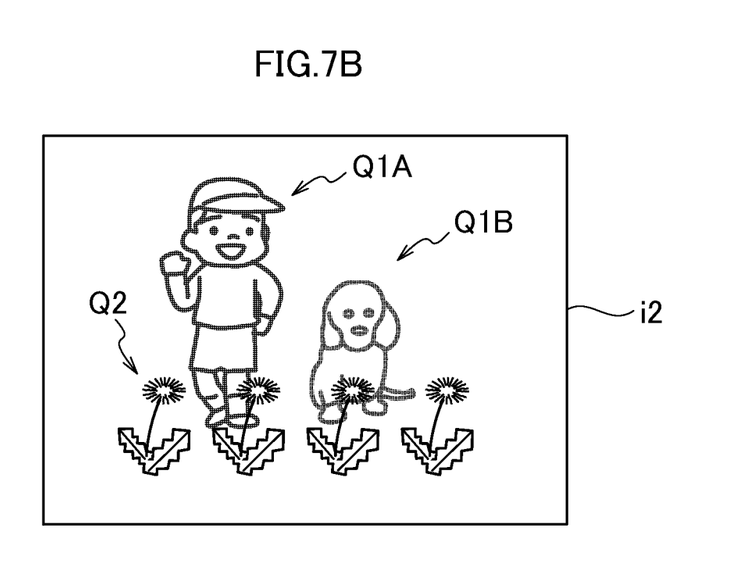
FIG. 7B is a diagram depicting an example of an image (an image corresponding to a near focal region) when imaging signals corresponding to the respective focal regions are completely separated.

In the situation of FIG. 6, when images corresponding to the far focal region 12a and the near focal region 12b are obtained, images as depicted in examples of FIG. 7A and FIG. 7B are to be obtained if there is no crosstalk or shading. FIG. 7A depicts the image i1 corresponding to the far focal region 12a. In FIG. 7A, the subjects Q1A and Q1B at the distance b1 are accurately in focus, and the subject Q2 at the distance b2 is blurred according to a difference between the distances b1 and b2. On the other hand, FIG. 7B depicts the image i2 corresponding to the near focal region 12b. In FIG. 7B, the subject Q2 at the distance b2 is accurately in focus, and the subjects Q1A and Q1B at the distance b1 are blurred according to the difference between the distances b1 and b2.

Figure 8A:
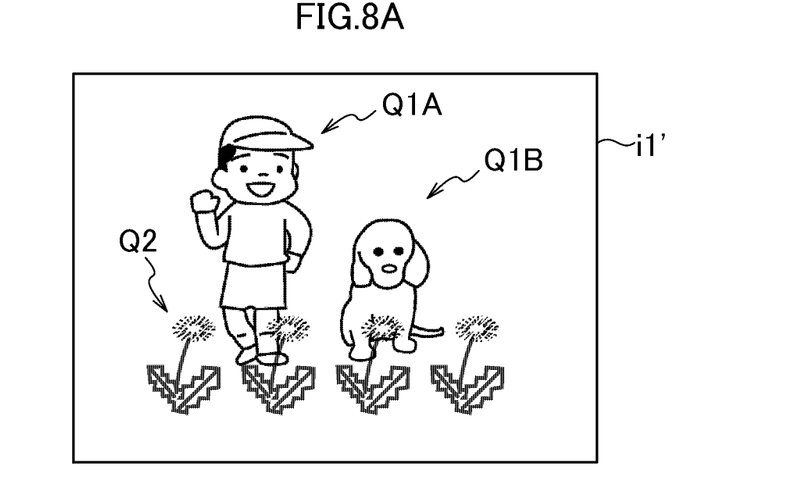
FIG. 8A is a diagram depicting an example of an image (an image corresponding to a far focal region) when imaging signals corresponding to the respective focal regions are not completely separated.
Figure 8B:
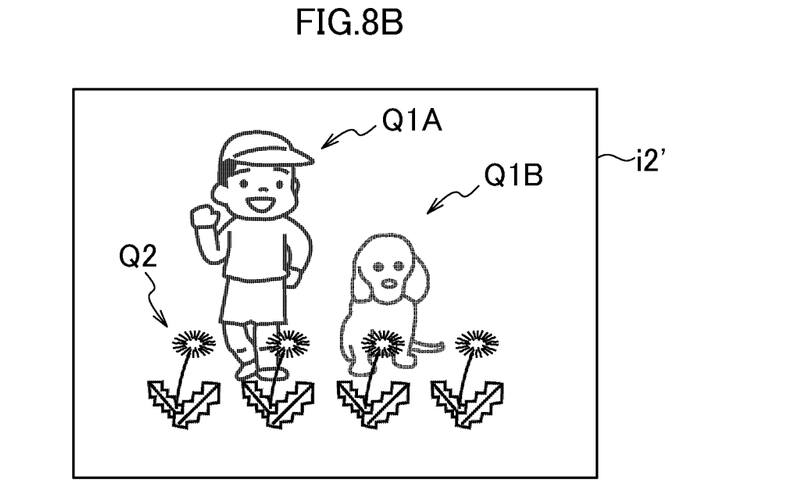
FIG. 8B is a diagram depicting an example of an image (an image corresponding to a near focal region) when imaging signals corresponding to the respective focal regions are not completely separated.

In practice, however, in the imaging signal of the far focal region 12a, the influence (crosstalk) of the light beam passing through the near focal region 12b and shading of the imaging signal itself (main gain) of the far focal region 12a are present. The same goes for the image i2 corresponding to the near focal region 12b. FIG. 8A depicts an example of an actual image i1' corresponding to the far focal region 12a, and FIG. 8B depicts an example of an actual image i2' corresponding to the near focal region 12b. In these images i1' and i2', a plurality of images with a difference in blurring amount and a parallax shift are superposed each other to degrade image quality.

In view of these circumstances, in the imaging device 10, in addition to the CCD 16 capable of selective light receiving described above, a correction is made in the following manner to remove the influence of crosstalk and shading to obtain an image with favorable image quality. Details of this correction are described below.

<Details of Correction>

First, ideal signal distributions corresponding to the far focal region 12a and the near focal region 12b (signal distributions without crosstalk or shading) are taken as A(x, y) and B(x, y), and actual signal distributions influenced by crosstalk and main gain shading are taken as A'(x, y) and B'(x, y). Also, crosstalk and main gains are represented as follows.

$S_a(x, y)$: gain distribution of the far focal region 12a
$S_b(x, y)$: gain distribution of the near focal region 12b
$C_{ba}(x, y)$: distribution of crosstalk from the near focal region 12b to the far focal region 12a
$C_{ab}(x, y)$: distribution of crosstalk from the far focal region 12a to the near focal region 12b Here, (x, y) represents a picture element position of an image corresponding to each region. As such, position dependency of the influence of cross talk and main gain shading are taken into consideration in the present embodiment.

Then, relations among the original signal distributions A(x, y) and B(x, y) and actual signal distributions A'(x, y) and B'(x, y) are represented as follows.

$$A'(x, y) = S_a(x, y)A(x, y) + C_{ba}(x, y)B(x, y) \quad \text{(Equation 2)}$$

$$B'(x, y) = C_{ab}(x, y)A(x, y) + S_b(x, y)B(x, y) \quad \text{(Equation 3)}$$

From the above (Equation 2) and (Equation 3), A(x, y) and B(x, y) are derived as follows.

$$A(x, y) = \{S_b(x, y)A'(x, y) - C_{ba}(x, y)B'(x, y)\} / \{S_a(x, y)S_b(x, y) - C_{ab}(x, y)C_{ba}(x, y)\} \quad \text{(Equation 4)}$$

$$B(x, y) = \{S_a(x, y)B'(x, y) - C_{ab}(x, y)A'(x, y)\} / \{S_b(x, y)S_a(x, y) - C_{ba}(x, y)C_{ab}(x, y)\} \quad \text{(Equation 5)}$$

Therefore, A(x, y) and B(x, y) can be found by obtaining in advance data about crosstalk and main gain distributions ($S_a$, $S_b$, $C_{ab}$ and $C_{ba}$ described above) by calculation based on the characteristics of the taking lens 12 and the CCD 16 or by measurement using a test pattern or a sample image. Thus obtained data about the crosstalk and main gain distributions may be stored in the EEPROM 46, or may be read via the memory card 54. And, by using the data about the crosstalk and main gain distributions thus obtained in advance, the CPU 40 controls the analog signal processing unit 20 (image correcting unit) and the digital signal processing unit 24 (image correcting unit) to perform correction processing, with the memory 48 taken as a work region.

In the imaging device 10, by performing this correction processing in addition to the CCD 16 capable of selective light receiving described above, the influence of crosstalk and main gain shading can be collectively removed. Also, in processing, in consideration of position dependency of these influences, removal can be accurately performed. Therefore, in an image corresponding to one of the far focal region 12a and the near focal region 12b, the influence of the other region is removed, and a plurality of images with different focal distances can be simultaneously obtained with favorable image quality.

Note that (Equation 2) to (Equation 5) can be extended when the number of regions is N (an integer of 2 or more) and are generally represented as (Equation 1).

Figure 9:
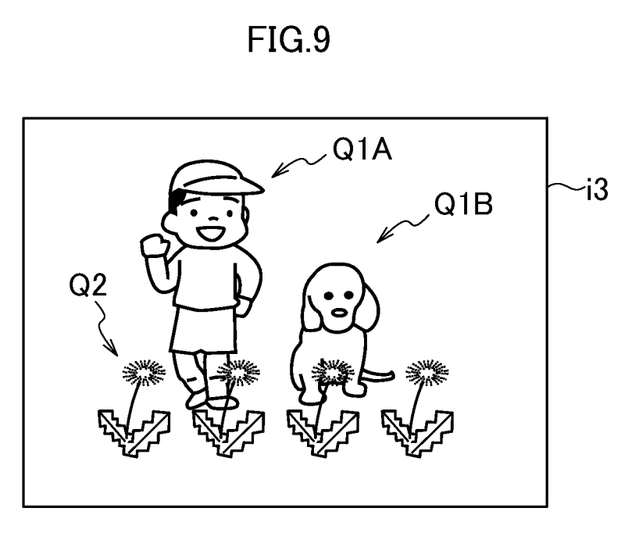
FIG. 9 is a diagram depicting an example of an image obtained at the imaging device 10.

In the imaging device 10 according to the present embodiment, images with the influence of crosstalk and main gain shading removed can be obtained. In addition, an image obtained by combining these images can also be generated. FIG. 9 is a diagram depicting an example of such a combined image, where an image i3 obtained by combining images with the influence of crosstalk and main gain shading removed is depicted in which all subjects Q1A, Q1B, and Q2 clearly appear.

The influence of crosstalk and main gain shading described above appears as a shift from a unit matrix of the above-described matrix X. When the degree of these influences is small and the influence is negligible for the purpose of using the image or when only one of crosstalk and main gain is removed, an $X_{ii}$ component (a diagonal component in the matrix X) corresponding to the main gain is taken as 1 and a $C_{ji}$ component (a non-diagonal component in the matrix X) corresponding to crosstalk is taken as 0 in the matrix X according to the purpose.

Note that in making a correction, in consideration of calculation accuracy (error) of the data about crosstalk and main gain distributions, a filter may be used for statistical processing.

<Modification Examples of Imaging Device>

Figure 10A:
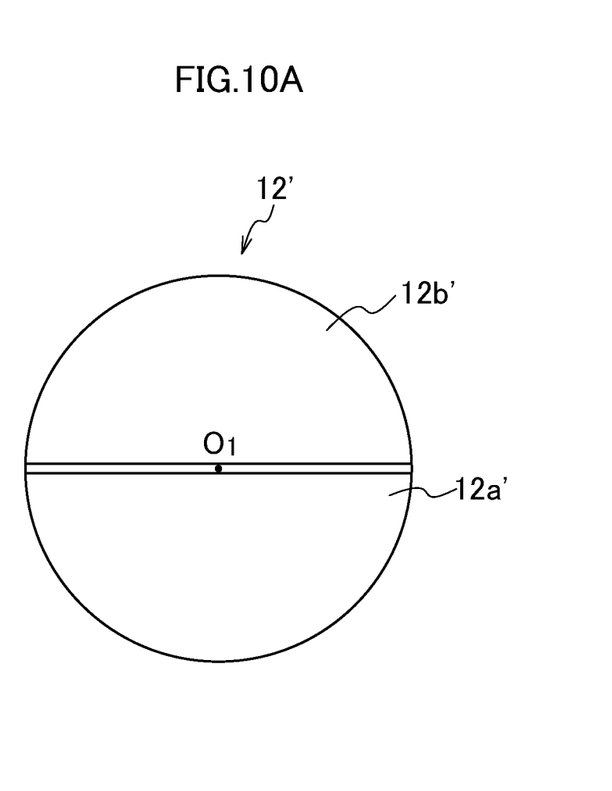
FIG. 10A is a plan view depicting an example of a taking lens formed of two or more physically separated lenses.
Figure 10B:
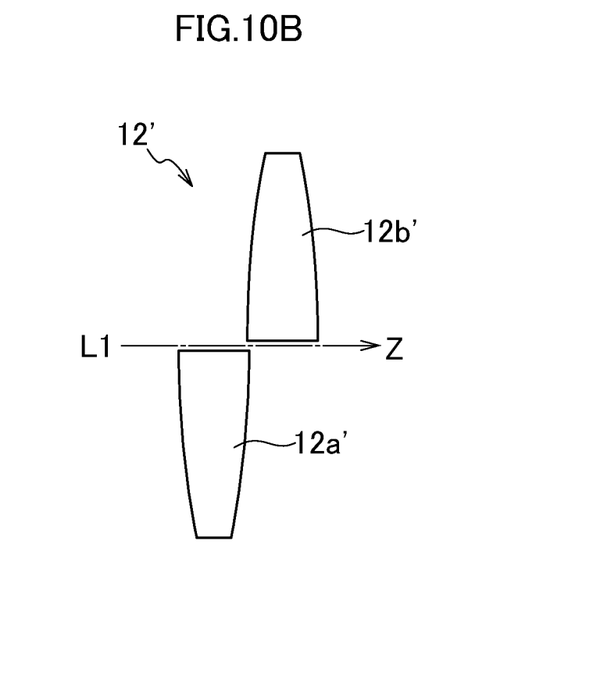
FIG. 10B is a side view depicting the example of the taking lens formed of two or more physically separated lenses.

While the case has been described in the above-described embodiment in which the taking lens is a lens as depicted in FIG. 3, the taking lens is not restricted to this mode in the imaging device according to the present invention. FIG. 10A and FIG. 10B are diagrams depicting another mode of the taking lens. A taking lens 12' depicted in FIG. 10A and FIG. 10B is a taking lens formed of two or more physically separated lenses, and a plurality of regions of the taking lens each have an independent characteristic (either one of the focal distance and the focal length) corresponding to a combination of two or more lenses. In the taking lens 12', as depicted in FIG. 10A, half-moon-shaped regions when viewed from the front are provided above and below a lens center O1', which are a far focal region 12a' and a near focal region 12b' from below. And, these two focal regions act as physically separated two lenses, configuring the taking lens 12' as a whole. In these regions, specific values of the focal lengths may be set according to the imaging purposes or the like. Note that, as depicted in FIG. 10B, the far focal region 12a' and the near focal region 12b' may be arranged at different positions in an optical axis L1 direction (Z direction).

Also in the imaging device according to the present invention, the characteristic (at least either one of the focal distance and the focal length) of the taking lens may be changed. A characteristic change can be achieved by any of various schemes, such as, for example, moving the entire taking lens or moving part of the plurality of lenses which configure the taking lens. Also, any of two or more lenses which configure the taking lens as depicted in FIG. 10A and FIG. 10B may be rotated and moved. This lens movement and rotation may be performed according to the rotation of a lens barrel by a photographer or by the CPU 40 controlling a lens driving unit including a motor and a PZT (piezo element). By changing the characteristic in this manner, a plurality of images can be simultaneously obtained with a desired characteristic and combination thereof.

Note that when the focal distance or the focal length is changed, the state of the difference in the subject image is varied according to the combination of the focal distance and the focal length of each region after change (whether the values are different or equal) (refer to the description about the first mode of the present invention). Also, when the focal distance or the focal length is allowed to be changed, it is preferable to obtain and stored crosstalk and main gain distributions in advance so as to correspond to the focal distance and the focal length, or make a formulation so that data corresponding to a desired focal distance and focal length can be obtained.

While the present invention has been described by using the embodiments and modification examples thereof, the modes of the present invention are not restricted to the modes described above, and can be variously modified in a range not deviating from the spirit of the present invention.

What is claimed is:

1. An imaging device comprising:
   a taking lens having a plurality of regions, the plurality of regions each with an independent characteristic;
   an image pickup element having a plurality of light-receiving sensors provided so as to correspond to the plurality of regions, the plurality of light-receiving sensors performing pupil division of a light beam passing through any of the plurality of regions for selective light-receiving;
   an image generating unit which generates, from an imaging signal from a light-receiving sensor corresponding to one region of the plurality of regions, an image corresponding to the one region; and
   an image correcting unit which corrects the generated image, wherein,
   the independent characteristic is at least either one of a focal length and a focal distance, and
   the image correcting unit performs removal of an influence of a light beam passing through a region other than the one region from the image generated so as to correspond to the one region based on the following equation:

$$(A_1, A_2, \ldots, A_N)^T = X^{-1} \cdot (A_1', A_2', \ldots, A_N')^T,$$

where
   N: a number of the regions of the taking lens (an integer equal to two or more),
   $A_i(x, y)$: an imaging signal after correction of the influence of the light beam passing through another region corresponding to the region i (i=1 to N),
   $A_i'(x, y)$: an imaging signal before correction of the influence of the light beam passing through another region corresponding to the region i (i=1 to N),
   $X^{-1}$ an inverse matrix of a matrix X formed of main gain and crosstalk components, where
   $X_{ii}=S_i(x, y)$ (main gain of the region i; i=1 to N), and
   $X_{ji}=C_{ji}(x, y)$ (crosstalk component from the region j to the region i; j=1 to N, j ≠ i), and
   (x, y): picture element position of an image corresponding to a region i.

2. The imaging device according to claim 1, wherein the image correcting unit performs the removal in consideration of position dependency of a degree of the influence of the light beam passing through the region other than the one region in the generated image.

3. The imaging device according to claim 1, wherein the image correcting unit performs removal of an influence of shading on the light beam passing through the one region from the image generated so as to correspond to the one region.

4. The imaging device according to claim 3, wherein the image correcting unit performs the removal of the influence of shading in consideration of position dependency of the degree of the influence of shading in the generated image.

5. The imaging device according to claim 1, wherein the image generating unit generates an image by combining the plurality of images obtained by the removal.

6. The imaging device according to claim 1, wherein the taking lens is a taking lens formed of two or more physically separated lenses, and the plurality of regions of the taking lens each have an independent characteristic so as to correspond to a combination of the two or more lenses.

7. The imaging device according to claim 1, comprising a characteristic changing unit which changes the independent characteristic of the taking lens.

8. An imaging method in an imaging device including a taking lens having a plurality of regions, the plurality of regions each with an independent characteristic and an image pickup element having a plurality of light-receiving sensors provided so as to correspond to the plurality of regions, the plurality of light-receiving sensors performing pupil division of a light beam passing through any of the plurality of regions for selective light-receiving, the independent characteristic being at least either one of a focal length and a focal distance, the method comprising:

an image generating step of generating, from an imaging signal from a light-receiving sensor corresponding to one region of the plurality of regions, an image corresponding to the one region; and an image correcting step of correcting the generated image, wherein an influence of a light beam passing through a region other than the one region is removed from the image generated so as to correspond to the one region based on the following equation:

$$(A_1, A_2, \ldots, A_N)^T = X^{-1} \cdot (A_1', A_2', \ldots, A_N')^T,$$

where

N: a number of the regions of the taking lens (an integer equal to two or more), $A_i(x, y)$: an imaging signal after correction of the influence of the light beam passing through another region corresponding to the region i (i=1 to N), $A_i'(x, y)$: an imaging signal before correction of the influence of the light beam passing through another region corresponding to the region i (i=1 to N), $X^{-1}$: an inverse matrix of a matrix X formed of main gain and crosstalk components, where $X_{ii} = S_i(x,y)$ (main gain of the region i; i =1 to N), and
$X_{ji} = C_{ji}(x, y)$ (crosstalk component from the region j to the region i; j=1 to N, j ≠ i), and (x, y): picture element position of an image corresponding to a region i.

* * * * *